US006807303B1

United States Patent
Kim et al.

(10) Patent No.: US 6,807,303 B1
(45) Date of Patent: Oct. 19, 2004

(54) METHOD AND APPARATUS FOR RETRIEVING MULTIMEDIA DATA USING SHAPE INFORMATION

(75) Inventors: Jong Deuk Kim, Seoul (KR); Nam Kyu Kim, Seoul (KR)

(73) Assignee: Hyundai Curitel, Inc., Kyoungki-do (KR)

( * ) Notice: Subject to any disclaimer, the term of this patent is extended or adjusted under 35 U.S.C. 154(b) by 0 days.

(21) Appl. No.: 09/494,675

(22) Filed: Jan. 31, 2000

(30) Foreign Application Priority Data

Feb. 1, 1999 (KR) .............................. 10-1999-0003189

(51) Int. Cl.$^7$ ............................. G06K 9/46; G06K 9/34
(52) U.S. Cl. ..................................... 382/203; 382/173
(58) Field of Search ................................ 382/203, 173

(56) References Cited

U.S. PATENT DOCUMENTS

| | | | | |
|---|---|---|---|---|
| 5,164,992 A | * | 11/1992 | Turk et al. | 382/118 |
| 5,612,928 A | * | 3/1997 | Haley et al. | 367/11 |
| 5,644,765 A | * | 7/1997 | Shimura et al. | 707/104.1 |
| 5,710,833 A | * | 1/1998 | Moghaddam et al. | 382/228 |
| 5,852,823 A | | 12/1998 | De Bonet | 707/6 |
| 5,901,244 A | * | 5/1999 | Souma et al. | 382/190 |
| 6,038,337 A | * | 3/2000 | Lawrence et al. | 382/156 |
| 6,049,623 A | * | 4/2000 | Fuderer et al. | 382/131 |
| 6,134,541 A | * | 10/2000 | Castelli et al. | 707/2 |
| 6,332,037 B1 | * | 12/2001 | Zhu | 382/173 |

OTHER PUBLICATIONS

A transformation–invariant recursive subdivision method for shape analysis. Zhu Quiming; Poh Lay–Kheng, Pattern Recognition, 1998., 9th International Conference on, 1988, pp. 833–835 vol. 2.*

* cited by examiner

Primary Examiner—Leo Boudreau
Assistant Examiner—Hussein Akhavannik
(74) Attorney, Agent, or Firm—Merchant & Gould P.C.

(57) ABSTRACT

A method and apparatus for retrieving multimedia data using shape information. The multimedia data retrieval apparatus comprises a shape information feature extractor for receiving shape information of a query image and extracting a feature of the received shape information using a shape information descriptor based on eigen vectors of a multi-layer covariance matrix, an image feature extractor for extracting a feature of each image data in the same manner as the shape information feature extractor, a multimedia database creator for creating a multimedia database on the basis of the features extracted by the image feature extractor, a similarity comparator for comparing the feature of the query image extracted by the shape information feature extractor with the features of the image data in the multimedia database to calculate similarities therebetween, and a compared result output unit for outputting the results calculated by the similarity comparator. Multimedia data can accurately and rapidly be retrieved by defining and using a shape information descriptor with a consistency against rotation, scaling and translation of the shape information.

36 Claims, 11 Drawing Sheets

(a) elliptical binary shape information     (b) rectangular binary shape information (a) elliptical binary shape information    (b) rectangular binary shape information (a) object region in first layer (b) reference region in first layer (c) object regions in second layer (d) reference regions in second layer (e) object regions in third layer (f) reference regions in third layer

METHOD AND APPARATUS FOR RETRIEVING MULTIMEDIA DATA USING SHAPE INFORMATION

BACKGROUND OF THE INVENTION

1. Field of the Invention

The present invention relates in general to a method and apparatus for retrieving multimedia data by extracting a feature of shape information of an image using eigen vectors of a shape information covariance matrix and calculating a similarity on the basis of the extracted feature, and more particularly to a method and apparatus for retrieving multimedia data, in which the multimedia data can rapidly and accurately be retrieved by using multilayer eigen vectors capable of expressing complex shape information in detail and having a consistency against even rotation, scaling and translation of an image.

2. Description of the Prior Art

Up to now, a language-based search has mostly been used for data retrieval. However, recently, massive multimedia data composed of movies, synthetic images, still images, voice, moving images, music and others as well as characters has been present on Internet or a multimedia database according to developments of the Internet and multimedia, resulting in a need for retrieving such multimedia data. This has keenly required an effective retrieval method capable of readily retrieving multimedia data desired by the user from bulky data on the Internet or multimedia database.

Multimedia data is much larger in size than data composed of only characters, and it is a combination of various types of information such as images, sounds, characters, etc. As a result, it is next to impossible to retrieve desired multimedia data using the multimedia data itself. For this reason, in order to retrieve multimedia data from a multimedia database, respective multimedia data expressible features are previously extracted through a preprocessing procedure and then compared respectively with information in the multimedia database. For example, in the case of retrieving video with a mixture of images, voice and audio, respective features of the images, voice and audio are extracted and then calculated in similarity with information in a multimedia database to be retrieved. As a result, desired information can be retrieved in accordance with the similarity calculation. In this regard, key points in the multimedia data retrieval are the types of features of multimedia data to be considered, how to express the features and how to compare between the features. Herein, a data model expressive of each feature is called a descriptor.

A still image or moving image retrieval method is now most studied in multimedia data retrieval techniques. In such a retrieval method, features of an image, such as a color, texture, shape, etc. are extracted and then measured in similarity. For example, used as descriptors expressive of the color feature may be a color histogram, correlogram, etc. [see: J. Huang, S. R. Kumar, M. Mitra, W. J. Zhu, and R. Zabih, Image indexing using color correlation, Proc, 16th IEEE Conf. on computer Vision and Pattern Recognition, pp. 762–768, 1997]. Further, a wavelet coefficient, DFT coefficient, etc. may be used as descriptors expressive of the texture feature. In other words, various descriptors may be used to express one feature and have both merits and demerits. In this connection, the performance of a retriever may be greatly influenced by an employed descriptor.

A shape information retrieval method is one of useful methods for image retrieval. Herein, shape information of an object signifies information indicating which pixel of an arbitrary image belongs to the object and which pixel of the arbitrary image belongs to a background. For an effective shape information retrieval, it is necessary to define a descriptor capable of appropriately expressing shape information of an object and compare a similarity of the shape information on the basis of the defined descriptor. Existing descriptors used for the shape information retrieval may generally be classified into two types: geometric feature-based descriptors and moment feature-based descriptors. The geometric feature-based descriptors may generally be a parameter, area, maximum radius, minimum radius, corner, roundness, etc., and the moment feature-based descriptors may be a center of mass, orientation, bounding rectangle, best-fit ellipse, eigen vector, etc. For the purpose of accurately and rapidly retrieving image data, the above shape information descriptors should be consistent regardless of any variation of an image such as rotation, scaling, translation, etc. of an object.

At present, the multimedia data retrieval still stays at the initial stage. One of existing shape information feature extraction methods is to use eigen vectors of a covariance matrix of shape information. As shown in FIG. 1, the eigen vectors of the covariance matrix are composed of two vectors capable of expressing a distribution of the shape information. The two eigen vectors have their directions signifying two axes (i.e., major and minor axes) indicative of distribution directions of the shape information, respectively, and their magnitudes representing distribution degrees of the shape information, respectively. Here, the major axis represents a main distribution direction of the shape information, and the minor axis represents a minimum distribution direction of the shape information.

Defining a covariance matrix C as in the below equation 1, eigen vectors of the covariance matrix can be calculated in the following manner:

$$c = \begin{bmatrix} c_{xx} & c_{xy} \\ c_{yx} & c_{yy} \end{bmatrix} \quad \text{[Equation 1]}$$

A center of mass $(m_x, m_y)$ of the shape information can be expressed as in the below equation 2:

$$m_x = \frac{1}{N}\sum_{i=0}^{N} x_i, \; m_y = \frac{1}{N}\sum_{i=0}^{N} y_i \quad \text{[Equation 2]}$$

In the above equation 2, "N" indicates the total number of pixels in the shape information, and "$x_i$" and "$y_i$" indicate the position of an ith pixel. Calculating the center of mass as in the above equation 2, respective components $C_{xx}$, $C_{yy}$, $C_{xy}$ and $C_{yx}$ of the covariance matrix can expressed by the following equation 3:

$$c_{xx} = \frac{1}{N}\sum_{i=0}^{N}(x_i - m_x)(x_i - m_x) \quad \text{[Equation 3]}$$

$$c_{xy} = \frac{1}{N}\sum_{i=0}^{N}(x_i - m_x)(y_i - m_y)$$

$$c_{yx} = \frac{1}{N}\sum_{i=0}^{N}(y_i - m_y)(x_i - m_x)$$

$$c_{yy} = \frac{1}{N}\sum_{i=0}^{N}(y_i - m_y)(y_i - m_y)$$

In the above equation 3, the components $C_{xx}$ and $C_{yy}$ of the covariance matrix indicate x-axis and y-axis distribution degrees of the shape information, respectively, and the components $C_{xy}$ and $C_{yx}$ of the covariance matrix indicate a correlation between x and y coordinates.

Defining eigen vectors of the covariance matrix C obtained in the above manner respectively as $A_1$ and $A_2$ and eigen values of the covariance matrix C respectively as $r_1$ and $r_2$, the following equation 4 is established therebetween:

$$\begin{bmatrix} c_{xx} & c_{xy} \\ c_{yx} & c_{yy} \end{bmatrix} * A_1 = r_1 * A_1 \quad \text{[Equation 4]}$$

$$\begin{bmatrix} c_{xx} & c_{xy} \\ c_{yx} & c_{yy} \end{bmatrix} * A_2 = r_2 * A_2$$

Consequently, the eigen vectors $A_1$ and $A_2$ and eigen values $r_1$ and $r_2$ of the covariance matrix C can be obtained by solving the above equation 4. As mentioned above, the eigen vectors $A_1$ and $A_2$ of the covariance matrix C represent the main and minimum distribution directions of the shape information, respectively, and the eigen values $r_1$ and $r_2$ of the covariance matrix C represent the distribution degrees of the shape information in the main and minimum distribution directions, respectively.

The above-mentioned shape information feature extraction method using the eigen vectors of the covariance matrix is able to express an approximate distribution of the shape information with a small amount of data and thus has advantages in that it is small in calculation amount, simple in calculation algorithm and has a consistency against translation of the shape information. However, the above-mentioned shape information feature extraction method is disadvantageous in that it has a limitation in accurate shape information expression because it should express the entire shape information using only two eigen vectors in a single layer. In other words, eigen vectors to be calculated with respect to different types of shape information may often have the same value, resulting in a grievous situation. Further, the eigen vectors have no consistency against scaling or rotation of the shape information. As a result, the eigen vectors are insufficient to define a descriptor for expression of the shape information, leading to a reduction in the accuracy of the associated multimedia data retrieval method.

SUMMARY OF THE INVENTION

Therefore, the present invention has been made in view of the above problems, and it is an object of the present invention to provide a method and apparatus for retrieving multimedia data, in which the multimedia data can accurately and rapidly be retrieved by adopting a shape information feature extraction method and apparatus capable of expressing complex shape information in detail using multilayer eigen vectors of a covariance matrix for the definition of a descriptor of the shape information.

It is another object of the present invention to provide a method and apparatus for retrieving multimedia data, in which the multimedia data can accurately and rapidly be retrieved by defining and using a shape information descriptor with a consistency against rotation, scaling and translation of an object.

In accordance with one aspect of the present invention, the above and other objects can be accomplished by a provision of a method for retrieving multimedia data using shape information, comprising the first step of receiving shape information of a query image and extracting a feature of the received shape information using a shape information descriptor based on eigen vectors of a multilayer covariance matrix; the second step of extracting a feature of each image data in the same manner as the above first step; the third step of creating a multimedia database on the basis of the features extracted at the above second step; the fourth step of comparing the feature of the query image with the features of the image data in the multimedia database to calculate similarities therebetween; and the fifth step of outputting the results calculated at the above fourth step.

In accordance with another aspect of the present invention, there is provided an apparatus for retrieving multimedia data using shape information, which is capable of embodying the above multimedia data retrieval method.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
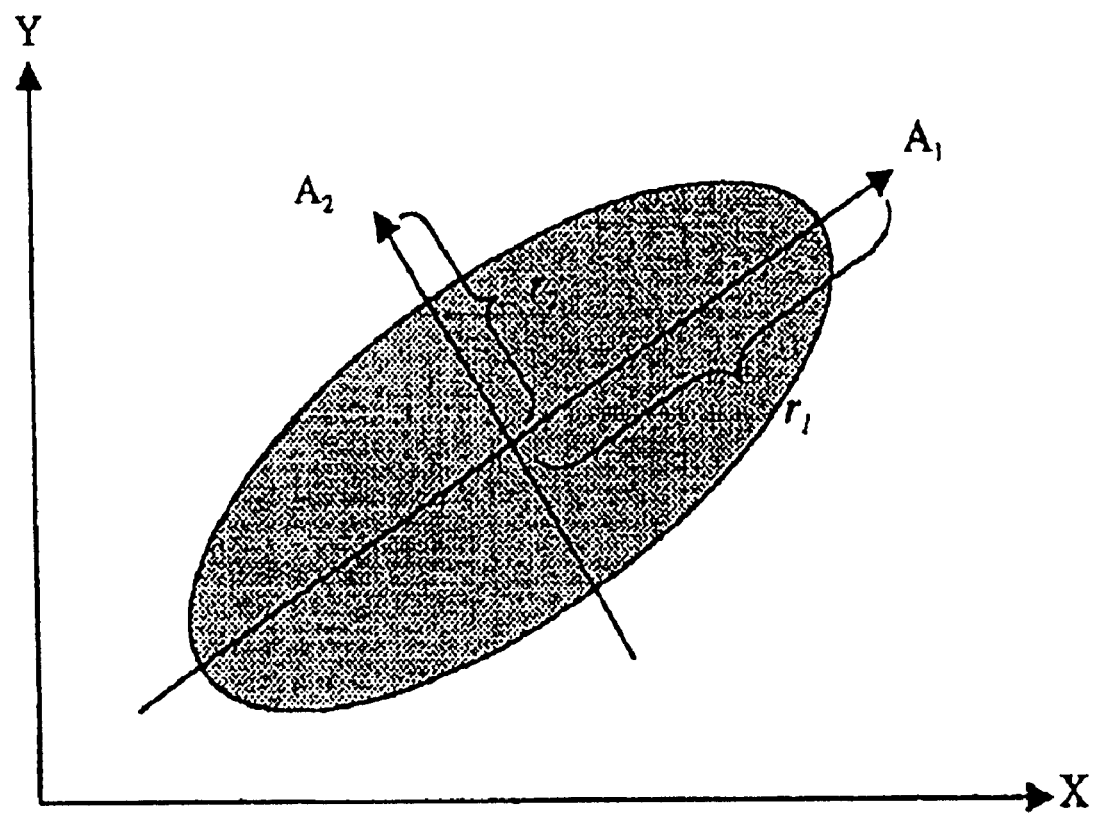
FIG. 1 is a graph illustrating eigen vectors of a covariance matrix (CMEVs)
Figure 2:
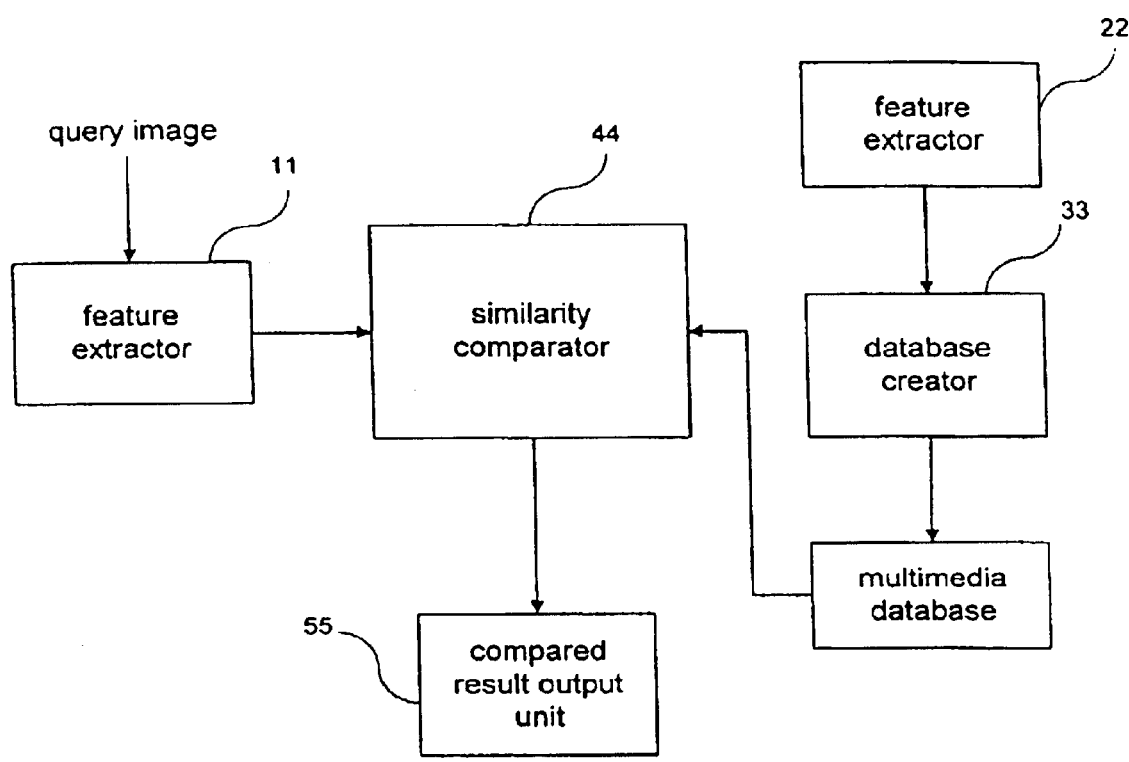
FIG. 2 is a schematic block diagram of a multimedia data retrieval apparatus in accordance with the present invention.

With reference to FIG. 2, there is schematically shown in block form the construction of a multimedia data retrieval apparatus in accordance with the present invention. In the present invention, a multimedia data retrieval method based on the multimedia data retrieval apparatus of FIG. 2 first receives shape information of a query image and extracts a feature of the received shape information using a shape information descriptor based on eigen vectors of a multilayer covariance matrix. Then, the multimedia data retrieval method extracts a feature of each image data in the same manner as the above step and creates a multimedia database on the basis of the extracted features. Subsequently, the multimedia data retrieval method compares the feature of the query image with the features of the image data in the created multimedia database to calculate similarities therebetween and outputs the calculated results. Therefore, the multimedia retrieval method of the present invention is characterized by the step of extracting a feature of shape information using a shape information descriptor defined in a proper manner and the step of comparing a similarity between two images on the basis of the extracted feature.

According to the present invention, the shape information feature extraction step is characterized in that a shape information descriptor is defined by applying eigen vectors of a covariance matrix (referred to hereinafter as CMEVs) to every layer.

In a different manner from the conventional technique of expressing shape information using only two eigen vectors, the present method partitions the shape information into a plurality of regions according to layers and obtains CMEVs for each of the partitioned regions. Because the obtained eigen vectors express shape information of the associated partitioned regions, respectively, they are increased in number in proportion to the number of the partitioned regions so that they can express the shape information in more detail. Therefore, the present invention is able to express complex shape information in more detail by applying the CMEVs to every layer.

Figure 3:
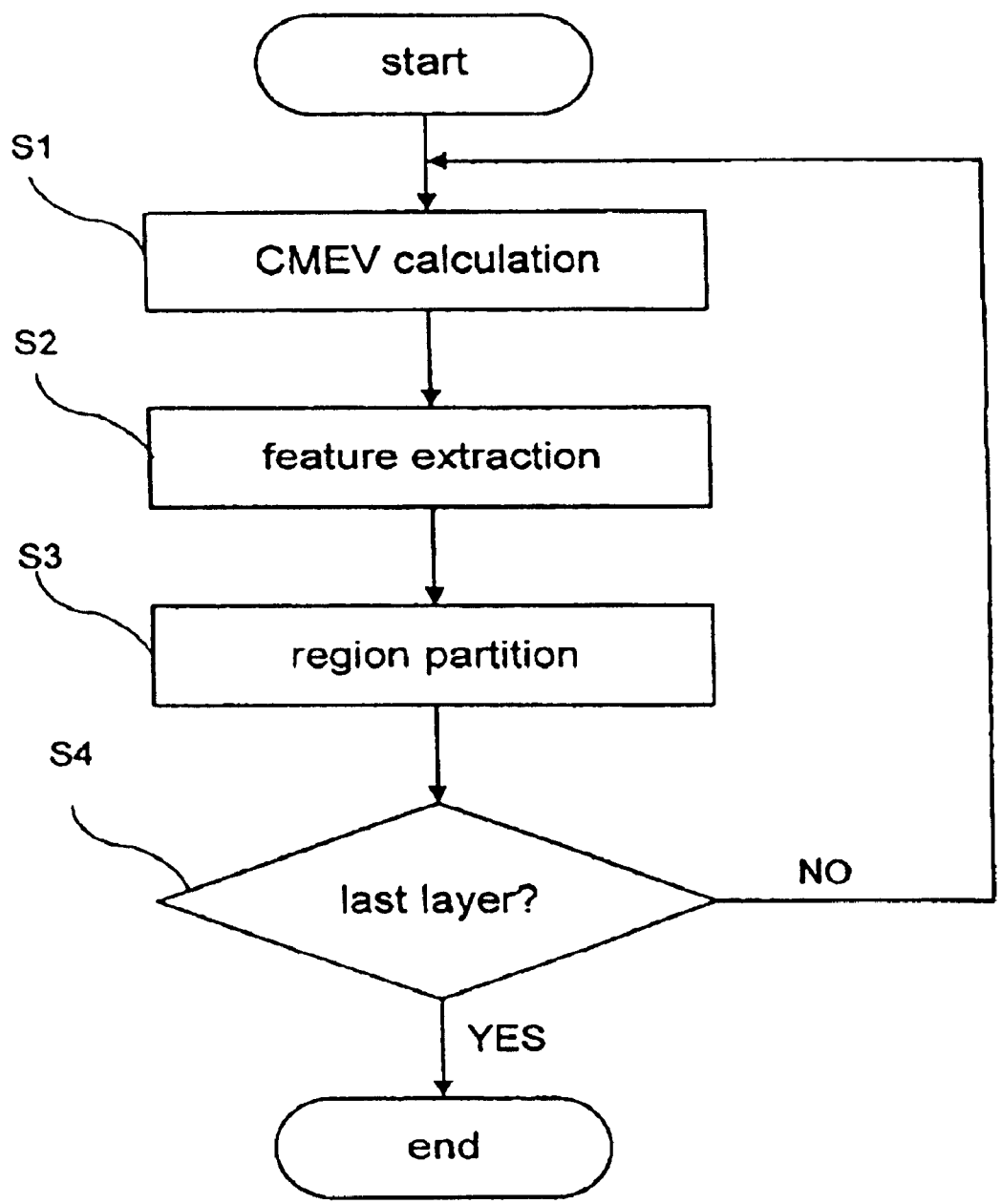
FIG. 3 is a flowchart illustrating a multilayer CMEV-based shape information feature extraction step in a multimedia data retrieval method in accordance with the present invention.

FIG. 3 is a flowchart illustrating the multilayer CMEV-based shape information feature extraction step in the multimedia data retrieval method in accordance with the present invention. First, CMEVs are obtained from the entire region of shape information at step S1 and a feature of the entire region of the shape information is extracted on the basis of the obtained CMEVs at step S2. Then, the entire region of the shape information is partitioned into a plurality of regions on the basis of two axis of the obtained CMEVs at step S3. It is determined at step S4 whether the partitioned regions belong to the last layer. If the partitioned regions do not belong to the last layer, the operation returns to the above step S1 to obtain CMEVs from the partitioned regions and extract features of the partitioned regions on the basis of the obtained CMEVs. Here, the last layer is determined according to the number of layers which is arbitrarily set to obtain information minutely to a degree desired by the user.

Although the present invention is mainly described with respect to a binary mask as binary shape information, it may be applied to any other object expressible element such as a contour representing the boundary between a background and an object.

Figure 4A:
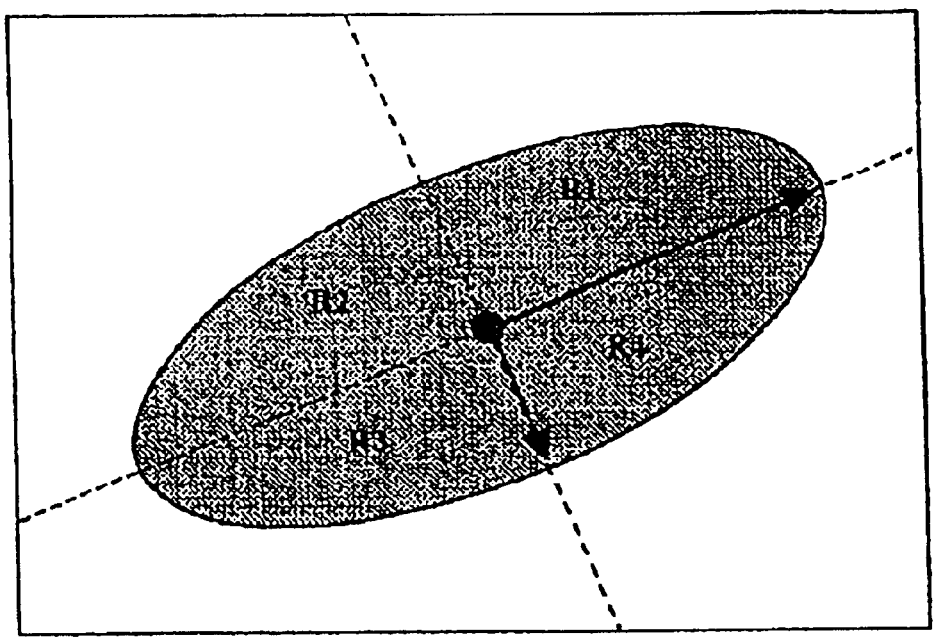
FIGS. 4a and 4b are views illustrating a region partition procedure for obtaining multilayer CMEVs in accordance with the present invention.
Figure 4B:
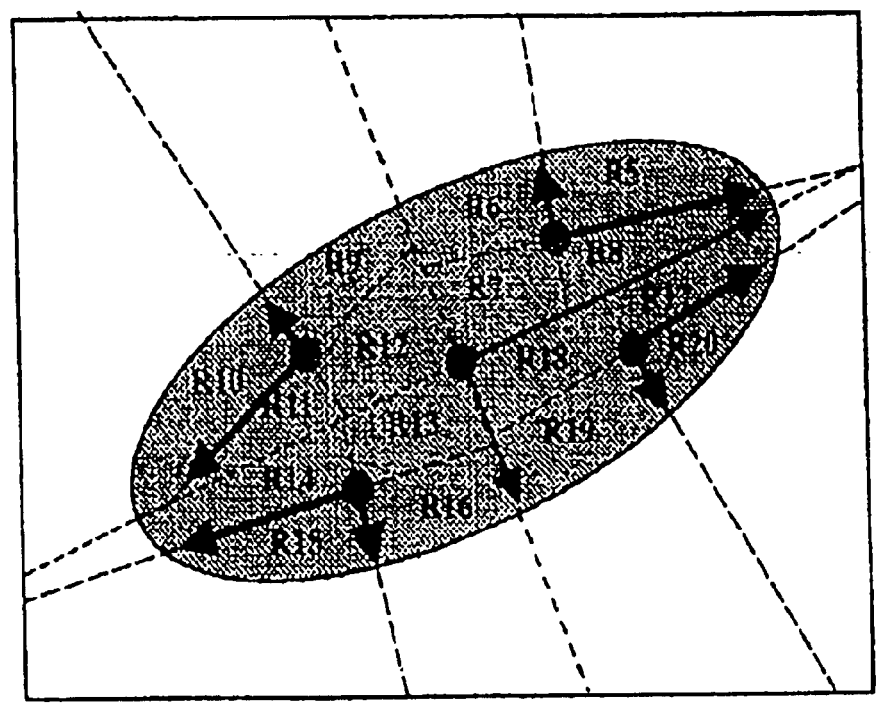

FIGS. 4a and 4b are views illustrating a region partition procedure for obtaining multilayer CMEVs in accordance with the present invention. FIG. 4a shows the first region partition. As shown in this drawing, CMEVs are obtained from the entire region of input shape information and two axes (major and minor axes) indicative of a distribution of the shape information are obtained from the CMEVs. As a result, the entire region of the shape information is partitioned into four regions R1, R2, R3 and R4 due to the intersection of the two axes. Subsequently, each of the partitioned regions R1, R2, R3 and R4 is repartitioned as in the above manner. Hence, as shown in FIG. 4b, the region R1 is partitioned into regions R5, R6, R7 and R8 and the remaining regions R2, R3 and R4 are similarly partitioned into regions R9–R20. A smaller number of partitioned layers leads to a smaller number of separated regions. Namely, as partitioned layers are increased in number, partitioned regions are similarly increased in number, thereby giving a more detailed expression of the shape information. In the preferred embodiment of the present invention, the number of layers may arbitrarily be set to express the shape information minutely to a degree desired by the user.

It should be noted that a shape information descriptor must appropriately be defined for the extraction of features of the shape information from the partitioned regions. In the preferred embodiment of the present invention, the shape information descriptor may be defined by a ratio of magnitudes (eigen values) of two eigen vectors of a covariance matrix, an eigen vector angle, a center point or a compactness, as will hereinafter be mentioned in detail.

(1) Ratio of Magnitudes of Two Eigen Vectors (Eigen Ratio)

In the preferred embodiment of the present invention, a feature of shape information may he expressed by a ratio of magnitudes (eigen values) of eigen vectors of a covariance matrix forming two axes. In this case, the ratio of the magnitudes of the two eigen vectors may be a ratio of the magnitude of the eigen vector of the minor axis to the magnitude of the eigen vector of the major axis or vice versa.

The reason why the eigen values of the major and minor axes themselves are not used but the ratio thereof is used as a shape information descriptor in the present invention is that the descriptor must have a consistency against scaling of the shape information. In other words, provided that eigen values are obtained from shape information with the same shape and different sizes, they will have a difference therebetween corresponding to the scaling of the shape information. However, the obtained eigen value ratio can be consistent regardless of the scaling of the shape information because the shape information is scaled in the same ratio with respect to both the major and minor axes.

(2) Eigen Vector Angle

In expressing a feature of shape information, the use of an eigen vector direction in a partitioned region as the feature of the shape information makes it possible to express a contour oriented property in the partitioned region, as will hereinafter be described with reference to FIGS. 5a and 5b.

Figure 5:
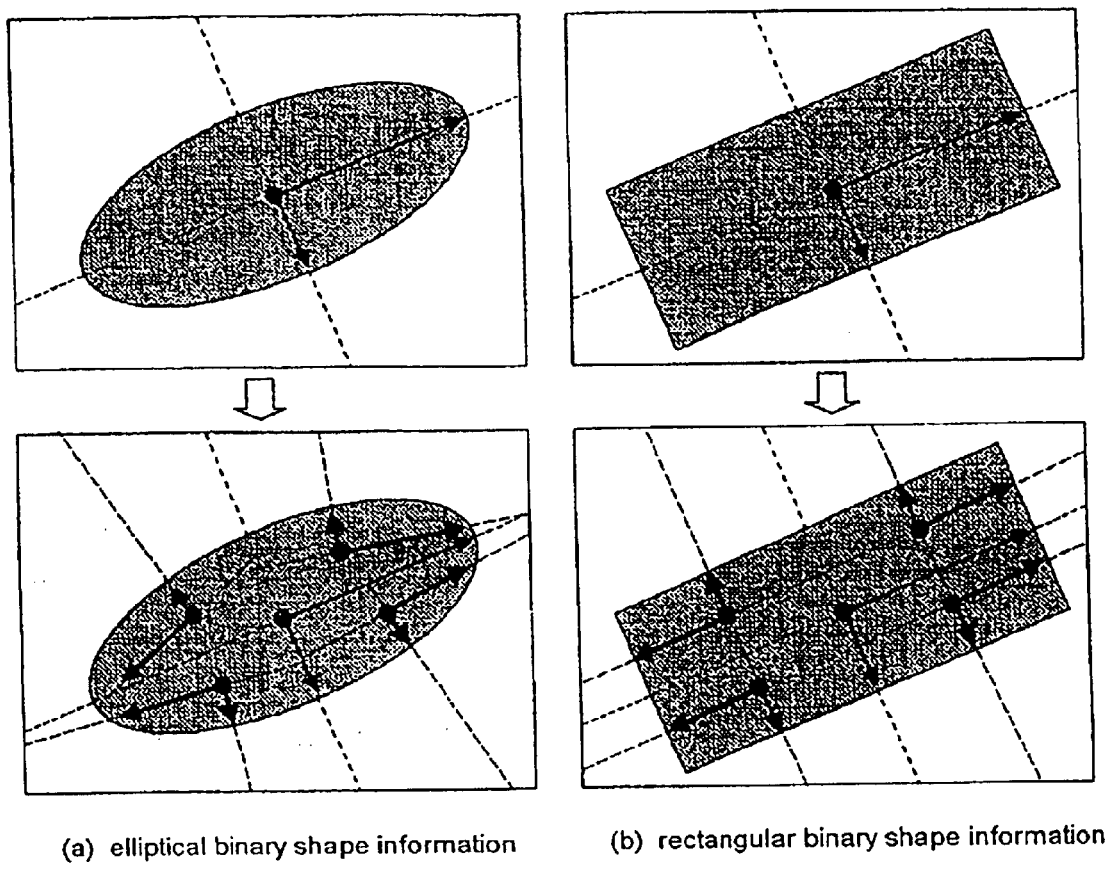
FIGS. 5a and 5b are views illustrating examples of shape information feature extraction based on an eigen vector angle in accordance with the present invention.

FIG. 5a shows an example where elliptical shape information is partitioned into two layers in accordance with the present invention, and FIG. 5b shows an example where rectangular shape information is partitioned into two layers in accordance with the present invention. Eigen vector magnitude ratios and angles obtained in the first layers are nearly the same in both cases. Accordingly, both types of shape information can be equally featured when they are expressed by only an eigen vector magnitude ratio in one layer. However, four eigen vector magnitude ratios obtained in the second layer of FIG. 5a are analogous to those of FIG. 5b, but eigen vector angles are different in both cases. Namely, it can be seen from FIG. 5a that the directions of eigen vectors in the second layer are slanted toward a contour. In this manner, the use of an eigen vector angle other than an eigen vector magnitude ratio as a shape information descriptor makes it possible to identify the different types of shape information as shown in FIGS. 5a and 5b and accurately extract features of those shape information.

Preferably, the eigen vector angle may be an angle of the eigen vector indicative of the major axis or an angle of the eigen vector indicative of the minor axis.

In the case where an eigen vector direction is used as a shape information descriptor, the associated eigen vector angle may be defined by an absolute value of a difference between an eigen vector angle obtained in the previous layer and an eigen vector angle obtained in the current layer. This allows the shape information descriptor to have a consistency against rotation of the shape information.

(3) Center Point (Center Point)

Figure 6A:
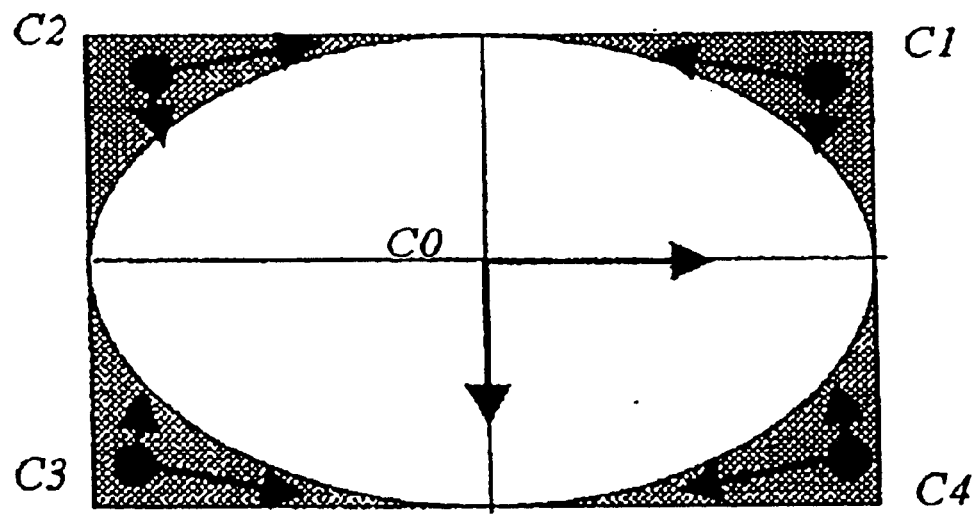
FIGS. 6a and 6b are views illustrating examples of shape information feature extraction based on a center point in accordance with the present invention.
Figure 6B:
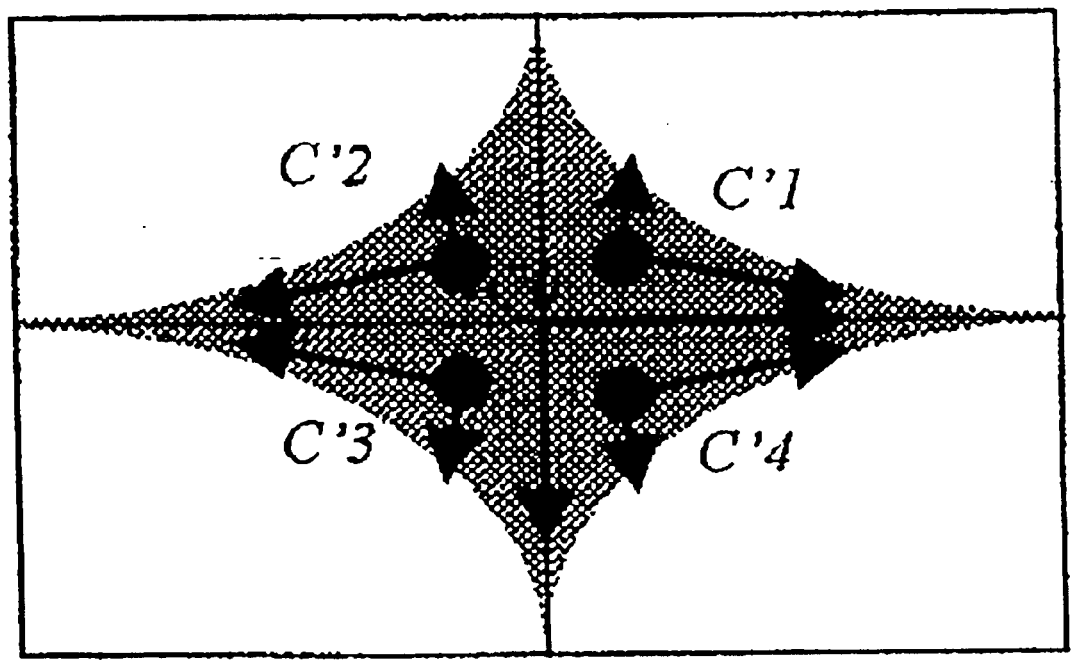

In the preferred embodiment of the present invention, a center point of each region other than the above-mentioned eigen vector magnitude ratio and angle may be used as a shape information descriptor for the shape information feature extraction. For example, in the case where different types of shape information have the same eigen vector magnitude ratio and angle as shown in FIGS. 6a and 6b, it is impossible to express features of the shape information on the basis of only the above-mentioned eigen vector magnitude ratio and angle. For this reason, it is preferred that a center point of each partitioned region is used as a shape information descriptor to make a distinction between the features of the shape information in FIGS. 6a and 6b. In FIG. 6a, a center point in each of the partitioned regions is far apart from a center of mass in the first layer. But, in FIG. 6b, a center of mass in the second layer is near the center of mass in the first layer. In this regard, the features of the shape information in FIGS. 6a and 6b can be differently expressed by the center point.

According to the present invention, the center point can be defined by any one of the following four methods.

1) The center point can be defined by relative coordinate values (x and y coordinate values) from a center of mass obtained in the first layer.

2) In order to ensure a consistency against rotation of shape information, the center point can be defined by relative coordinate values (x and y coordinate values) when two eigen vectors obtained in the first layer are set as two axes.

3) In order to ensure a consistency against rotation and scaling of shape information, the center point can be defined by values obtained by dividing coordinate values (x and y coordinate values) when two eigen vectors obtained in the first layer are set as two axes, by an eigen value of the major or minor axis in the first layer or any other value with a consistency against the scaling of the shape information.

4) In order to ensure a simple calculation and a consistency against rotation and scaling of shape information, the center point can be defined by a value obtained by dividing a distance from a center of mass obtained in the first layer to a center of mass of each region by an eigen value of a major or minor axis obtained in the first layer or any other reference value. This fourth method is more advantageous than the first to third methods in that the center point is defined by one value about the distance instead of two values about the x and y coordinates.

(4) Compactness

In the preferred embodiment of the present invention, a compactness may be obtained with respect to each region of a multilayer to express a feature of shape information. Preferably, the compactness may be defined by a ratio of the number of pixels in an object region to the number of pixels in the entire region.

Figure 7:
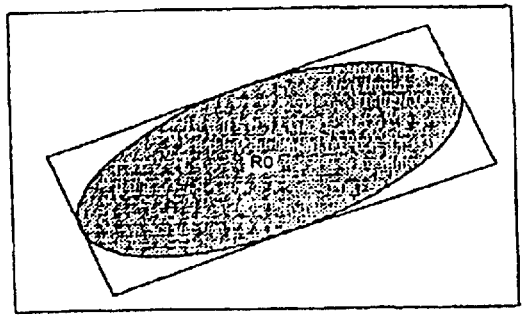
FIGS. 7a to 7f are views illustrating a shape information feature extraction procedure based on a compactness in accordance with the present invention.
Figure 7:
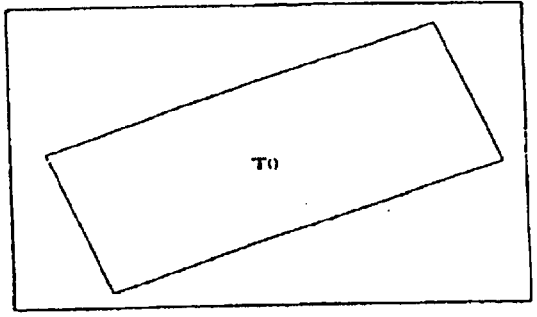
Figure 7:
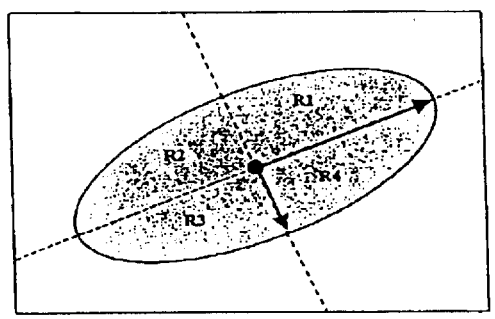
Figure 7:
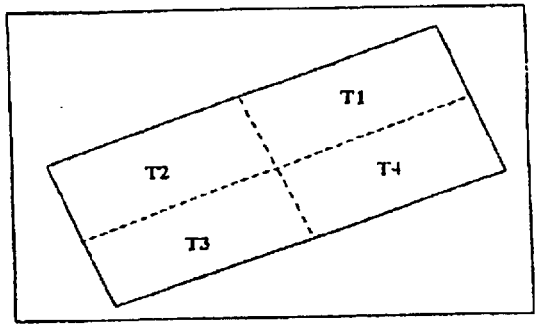
Figure 7:
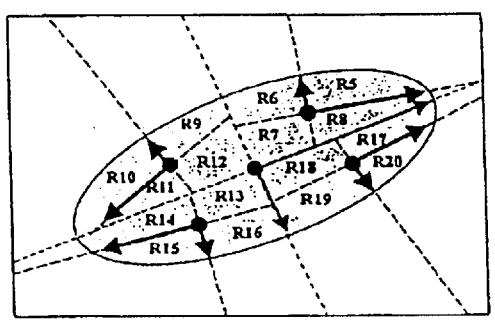
Figure 7:
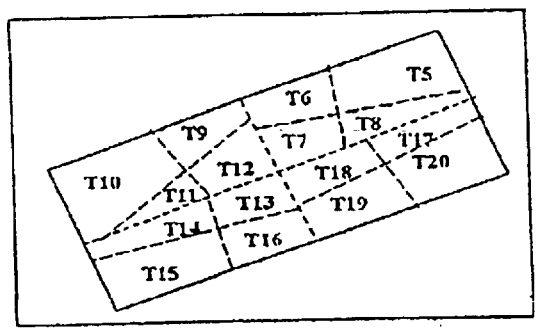

FIGS. 7a to 7f are views illustrating a shape information feature extraction procedure based on the compactness in accordance with the present invention. FIGS. 7a and 7b show an example where the compactness is obtained in the first layer. In the preferred embodiment of the present invention, the compactness may be defined by a ratio of the number of pixels in an object region of each layer to the number of pixels in a reference region of the associated layer instead of a ratio of the number of pixels in the original object region to the number of pixels in the entire region. In this case, the compactness may have different values according to reference region determination methods. A reference region in the first layer is defined by a minimum rectangular region which is parallel with two axes of eigen vectors obtained in the first layer and fully contains an object region in the first layer. In FIG. 7b, the reference numeral T0 denotes the reference region in the first Layer. In FIG. 7d, the reference numerals T1, T2, T3 and T4 denote reference regions in the second layer, respectively. As shown in FIG. 7d, the reference region T0 is partitioned into the reference regions T1, T2, T3 and T4 by the two eigen vectors. In the same manner, reference regions in the third layer are defined as indicated by the reference numerals T5–T20 in FIG. 7f. Defining the reference regions in the above manner, the compactness in each of the reference regions can be calculated as in the following equation:

$$\text{compact}(i) = R_i/T_i$$

where, "R" represents the number of pixels in an object region, "T" represents the number of pixels in a reference region and "i" represents a number of either the object region or reference region.

Figure 8A:
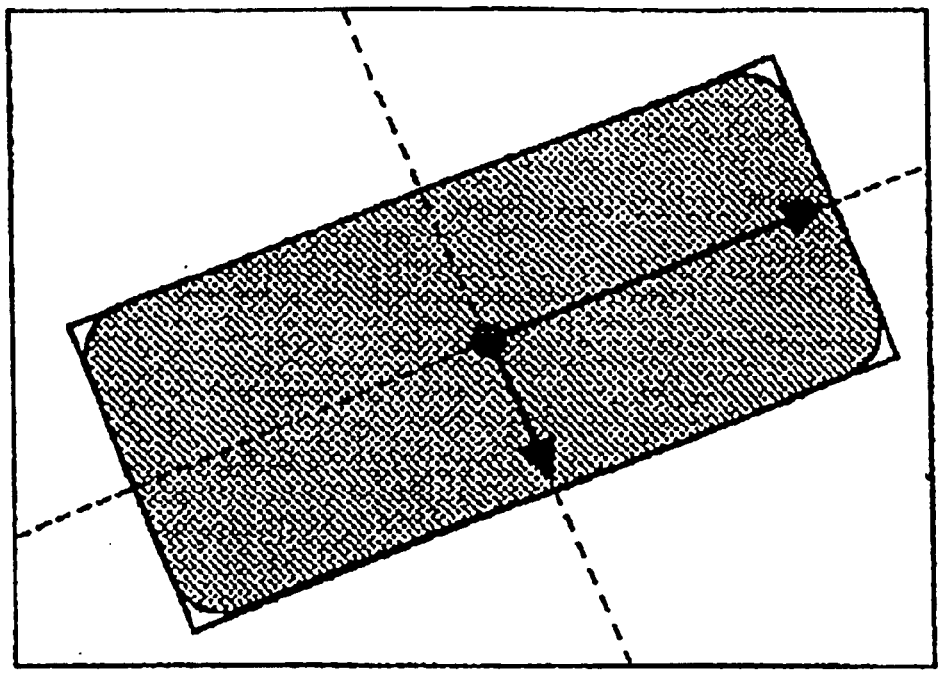
FIGS. 8a and 8b are views illustrating examples of shape information feature extraction based on the compactness in accordance with the present invention.
Figure 8B:
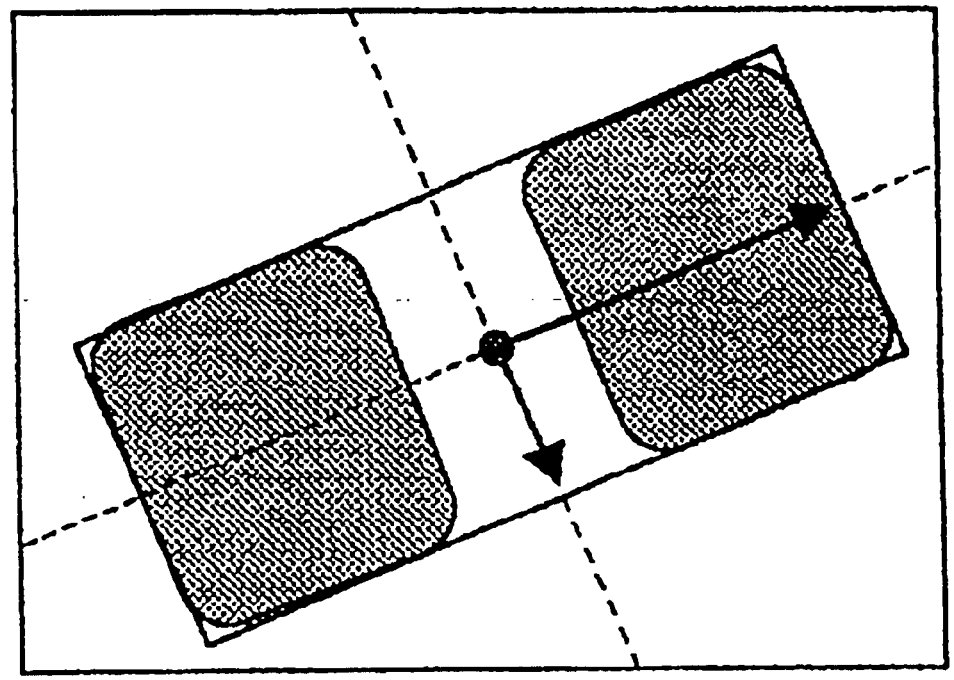

The reason why the compactness is used as a shape information descriptor in the present invention is that it can express, in distinction from each other, features of different types of shape information which have like eigen vector magnitude ratios but different shapes as shown in FIGS. 8a and 8b. In other words, the compactness in FIG. 8a is higher than hat in FIG. 8b, thereby making a distinction between two images.

In the multimedia data retrieval method of the present invention, the step of comparing the feature of the query image with the features of the image data in the multimedia database to calculate similarities therebetween includes the step of calculating a difference eigen_ratio_diff between eigen vector magnitude ratios, a difference angle_diff between eigen vector angles, a difference center_diff between center points and a difference compact_diff between compactnesses with respect to each region of the query image and image data.

In the case where a shape information descriptor is defined at the shape information feature extraction step by an absolute value of a difference between an eigen vector angle in the previous layer and an eigen vector angle in the current layer to have a consistency against rotation of shape information, a similarity comparison operation for the first layer is performed in a different manner from that for the subsequent layers at the similarity comparison step. That is, an eigen vector angle and a center point are used for the second layer and over, not for the first layer.

The similarity between two types of shape information can be compared on the basis of a match rate match_rate therebetween, which can be calculated as in the following equation 5. In the preferred embodiment of the present invention, a lower match rate indicates that two images are more similar and a higher match rate indicates that the two images are more different.

match_rate = [Equation 5]

$$\sum_{n=0}^{N-1} (w_1 \cdot \text{eigen\_ratio\_diff}(n) + w_2 \cdot \text{angle\_diff}(n) +$$

$$w_3 \cdot \text{center\_diff}(n) + w_4 \cdot \text{compact\_diff}(n))$$

$$N: \text{number of regions} \left( = \sum_{i=0}^{L-1} 4^i (L = \text{number of layers}) \right)$$

$w_{1-4}$: weights $\text{eigen\_ratio\_diff}(n) = |\text{eigen\_ratio}(f_n) - \text{eigen\_ratio}(s_n)|$ $\text{angle\_diff}(n) =$ $\quad \|\text{angle}(f_0) - \text{angle}(f_n)| - |\text{angle}(s_0) - \text{angle}(s_n)\|$ $\text{center\_diff}(n) = |\text{center}(f_n) - \text{center}(s_n)|$ $\text{compact\_diff}(n) = |\text{compact}(f_n) - \text{compact}(s_n)|$ -continued $f_i$: ith feature of first image $s_i$: ith feature of second image In the above equation 5, "N" represents the total number of regions, or the sum of the region numbers in respective layers, and "L" represents the number of layers. Also, "$f_i$" and "$s_i$" represent features of ith regions of two input images to be compared, respectively, and "$w_{1-4}$" signify weights applied respectively to descriptor differences (eigen_ratio_diff, angle_diff, center_diff and compact_diff) at the similarity comparison step.

At the similarity comparison step, the difference eigen_ratio_diff between the eigen vector magnitude ratios, the difference angle_diff between the eigen vector angles, the difference center_diff between the center points and the difference compact_diff between the compactnesses are calculated and summed. Alternatively, the weights may be set differently according to features of input shape information and the similarity may be measured on the basis of the resultant weights. For example, in the case where an eigen vector angle is used for the similarity comparison, the probability that the eigen vector angle will have a different value irrespective of shape information of a binary image becomes higher as an eigen vector magnitude ratio is approximated to 1. As a result, in this case, it is necessary to apply a weight to an eigen vector angle difference.

In the present invention, the eigen vector magnitude ratio difference eigen_ratio_diff is defined by an absolute value of a difference between an eigen vector magnitude ratio of first shape information and an eigen vector magnitude ratio of second shape information.

In one embodiment of the present invention, in the case where a shape information descriptor is defined by an eigen vector angle, the eigen vector angle difference angle_diff is defined by an absolute value of a difference between an absolute value of a difference between eigen vector angles in the previous and current layers of the first shape information and an absolute value of a difference between eigen vector angles in the previous and current layers of the second shape information. In an alternative embodiment of the present invention, in the case where a shape information descriptor is defined by an absolute value of a difference between an eigen vector angle in the previous layer and an eigen vector angle in the current layer, the eigen vector angle difference angle_diff is defined by an absolute value of a difference between two eigen vector angles as in the below equation 6:

$$\text{angle\_diff}(n) = |\text{angle}(f_n) - \text{angle}(s_n)| \quad \text{[Equation 6]}$$

In another embodiment of the present invention, the eigen vector angle difference angle_diff can be defined as in the below equation 7:

$$\text{angle\_diff}(n) = ||\text{angle}(f_0) - \text{angle}(f_n)| - |\text{angle}(s_0) - \text{angle}(s_n)|| \times (1 - \text{eigen\_ratio}(f_n)) \quad \text{[Equation 7]}$$

In the case where the eigen vector magnitude ratio eigen_ratio is approximated to 1, the eigen vector angle may be changed sensitively to a variation of shape information. In this regard, a smaller weight is applied to the eigen vector angle difference angle_diff if the eigen vector magnitude ratio eigen_ratio is approximated to 1, and a larger weight is applied to the eigen vector angle difference angle_diff if the eigen vector magnitude ratio eigen_ratio is approximated to 0. At this time, an eigen vector magnitude ratio eigen_ratio($f_n$) in the above equation 7 is used as a weight control factor. Alternatively, as the case may be, an eigen vector magnitude ratio eigen_ratio(s) may be used as the weight control factor or a combination of the eigen vector magnitude ratio eigen_ratio($f_n$) and eigen vector magnitude ratio eigen_ratio($s_n$) may be used as the weight control factor.

The center point difference center_diff is defined by an absolute of a difference between two center points, and the compactness difference compact_diff is defined by an absolute value of a difference between two compactnesses.

Now, a detailed description will be given of the multimedia data retrieval apparatus in accordance with the present invention.

Referring again to FIG. 2, the multimedia data retrieval apparatus comprises a shape information feature extractor 11 for receiving shape information of a query image and extracting a feature of the received shape information using a shape information descriptor based on eigen vectors of a multilayer covariance matrix. An image feature extractor 22 is adapted to extract a feature of each image data in the same manner as the shape information feature extractor 11. A multimedia database creator 33 is adapted to create a multimedia database on the basis of the features of the image data extracted by the image feature extractor 22. The multimedia data retrieval apparatus further comprises a similarity comparator 44 for comparing the feature of the query image extracted by the shape information feature extractor 11 with the features of the image data in the created multimedia database to calculate similarities therebetween, and a compared result output unit 55 for outputting the results calculated by the similarity comparator 44. For the multimedia data retrieval by the present apparatus, the shape information feature extractor 11 receives shape information of a query image and extracts a feature of the received shape information using a shape information descriptor based on eigen vectors of a multilayer covariance matrix. For the creation of a multimedia database, the image feature extractor 22 extracts a feature of each image data in the same manner as the shape information feature extractor 11, and the multimedia database creator 33 creates the multimedia database on the basis of the features of the image data extracted by the image feature extractor 22. The similarity comparator 44 compares the feature of the query image extracted by the shape information feature extractor 11 with the features of the image data in the created multimedia database to calculate similarities therebetween. Then, the compared result output unit 55 outputs the results calculated by the similarity comparator 44.

In the multimedia data retrieval apparatus of the present invention, the shape information feature extractor 11 and image feature extractor 22 are the same in construction, which will hereinafter be mentioned in detail with reference to FIG. 9.

Figure 9:
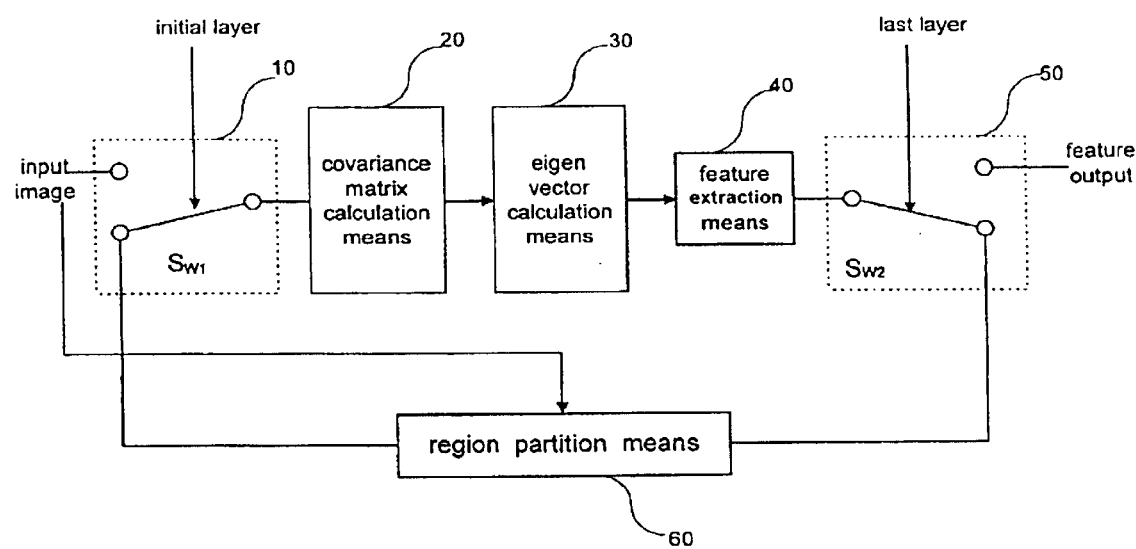
FIG. 9 is a block diagram of a multilayer CMEV-based shape information feature extractor in the multimedia data retrieval apparatus of FIG. 2.

Referring to FIG. 9, there is shown in block form the construction of each of the shape information feature extractor 11 and image feature extractor 22 in the multimedia data retrieval apparatus of the present invention. As shown in this drawing, each of the shape information feature extractor 11 and image feature extractor 22 includes a first witch $S_{w1}$ 10 for making a distinction between the initial input image and an output image from region partition means 60 and transferring the initial input image to covariance matrix calculation means 20 if a given layer is the initial layer and the output image from the region partition means 60 to the covariance matrix calculation means 20 if the given layer is not the initial layer. The covariance matrix calculation means 20 is adapted to calculate a covariance matrix for shape information of the image transferred from the first switch $S_{w1}$ 10. Each of the shape information feature extractor 11 and image feature extractor 22 further includes eigen vector calculation means 30 for calculating eigen vectors of the covariance matrix calculated by the covariance matrix calculation means 20, and feature extraction means 40 for extracting a feature of the shape information of the image transferred from the first switch $S_{w1}$ 10 on the basis of the eigen vectors calculated by the eigen vector calculation means 30. The region partition means 60 is adapted to partition the shape information of the image transferred from the first switch $S_{w1}$ 10 into four regions according to two axes of the eigen vectors calculated by the eigen vector calculation means 30 if the given layer is not the last layer. Each of the shape information feature extractor 11 and image feature extractor 22 further includes a second switch $S_{w2}$ 50 for transferring the feature extracted by the feature extraction means 40 to an output terminal if the given layer is the last layer and to the region partition means 60 if the given layer is not the last layer.

Figure 10:
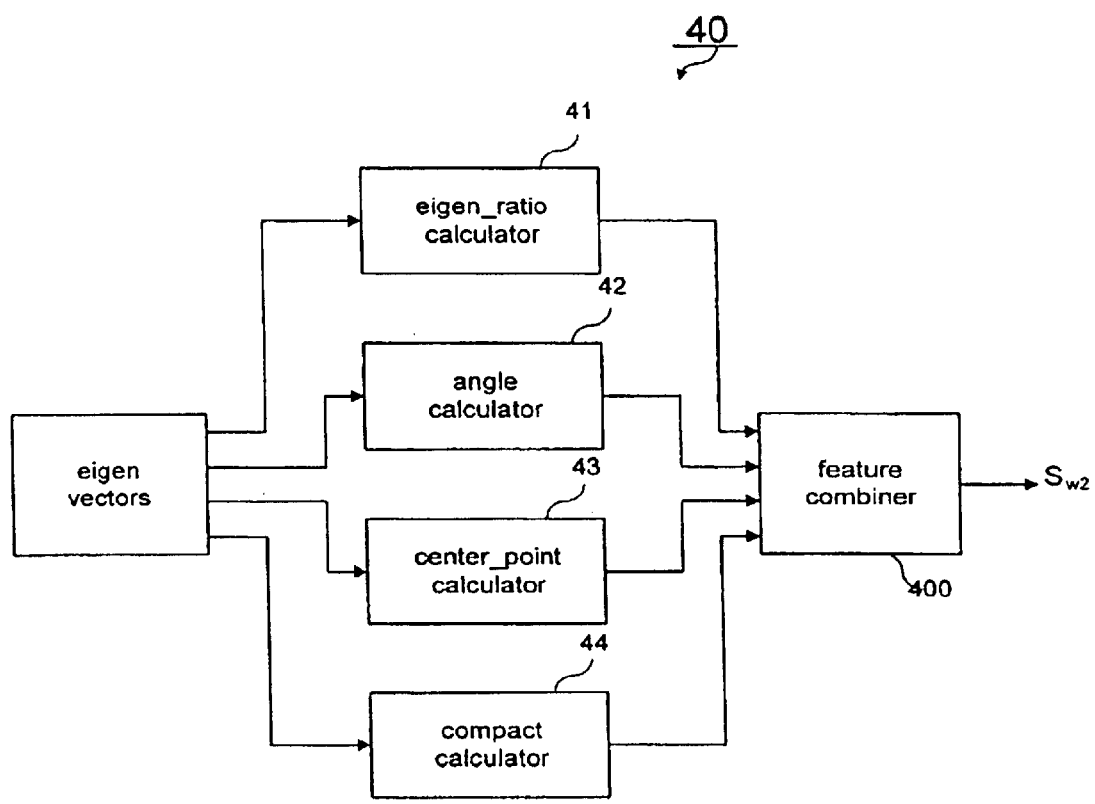
FIG. 10 is a detailed block diagram of feature extraction means in the shape information feature extractor of FIG. 9.

FIG. 10 is a detailed block diagram of the feature extraction means 40 in the shape information feature extractor 11 or image feature extractor 22 of FIG. 9. In the preferred embodiment of the present invention, the feature extraction means 40 may include any one or a combination of an eigen vector magnitude ratio calculator (referred to hereinafter as eigen_ratio calculator) 41, an eigen vector angle calculator (referred to hereinafter as angle calculator) 42, a center point calculator (referred to hereinafter as center_point calculator) 43 and a compactness calculator (referred to hereinafter as compact calculator) 44. Most preferably, the feature extraction means 40 may include all of the eigen_ratio calculator 41, angle calculator 42, center_point calculator 43 and compact calculator 44. In this case, the feature extraction means 40 extracts features such as an eigen vector magnitude ratio, an eigen vector angle, a center point and a compactness from the shape information of the image transferred from the first switch $S_{w1}$ 10 on the basis of the eigen vectors calculated by the eigen vector calculation means 30. The feature extraction means 40 further includes a feature combiner 400 for combining the extracted features into a desired format and outputting the combined result to the second switch $S_{w2}$.

Preferably, the above calculators in the feature extraction means 40 may be provided as means for realizing the respective embodiments at the shape information feature extraction step in the multimedia data retrieval method of the present invention as stated previously.

Next, a detailed description will be given of the operation of the shape information feature extractor 11 in the multimedia data retrieval apparatus of the present invention.

First, upon receiving an image of the first layer, the first switch $S_{w1}$ 10 transfers the received image to the covariance matrix calculation means 20, which then calculates a covariance matrix for shape information of the transferred image. The eigen vector calculation means 30 calculates eigen vectors of the covariance matrix calculated by the covariance matrix calculation means 20, and the feature extraction means 40 extracts a feature of the shape information of the image transferred from the first switch $S_{w1}$ 10 on the basis of the eigen vectors calculated by the eigen vector calculation means 30. The second switch $S_{w2}$ 50 determines whether a given layer is the last layer. If the given layer is not the last layer, the second switch $S_{w2}$ 50 transfers the feature extracted by the feature extraction means 40 to the region partition means 60. Then, the region partition means 60 partitions the shape information of the image transferred from the switch $S_{w1}$ 10 into four regions according to two axes of the eigen vectors calculated by the eigen vector calculation means 30 and transfers an image of each of the partitioned regions to the covariance matrix calculation means 20 through the first switch $S_{w1}$ 10. Subsequently, the covariance matrix calculation means 20 calculates a covariance matrix for shape information of the transferred image, the eigen vector calculation means 30 calculates eigen vectors of the covariance matrix calculated by the covariance matrix calculation means 20, and the feature extraction means 40 extracts a feature of the shape information of the transferred image on the basis of the eigen vectors calculated by the eigen vector calculation means 30. This operation is repeated until the given layer becomes the last layer. When the given layer is the last layer, the second switch $S_{w2}$ 50 transfers the feature extracted by the feature extraction means 40 to the output terminal.

Figure 11:
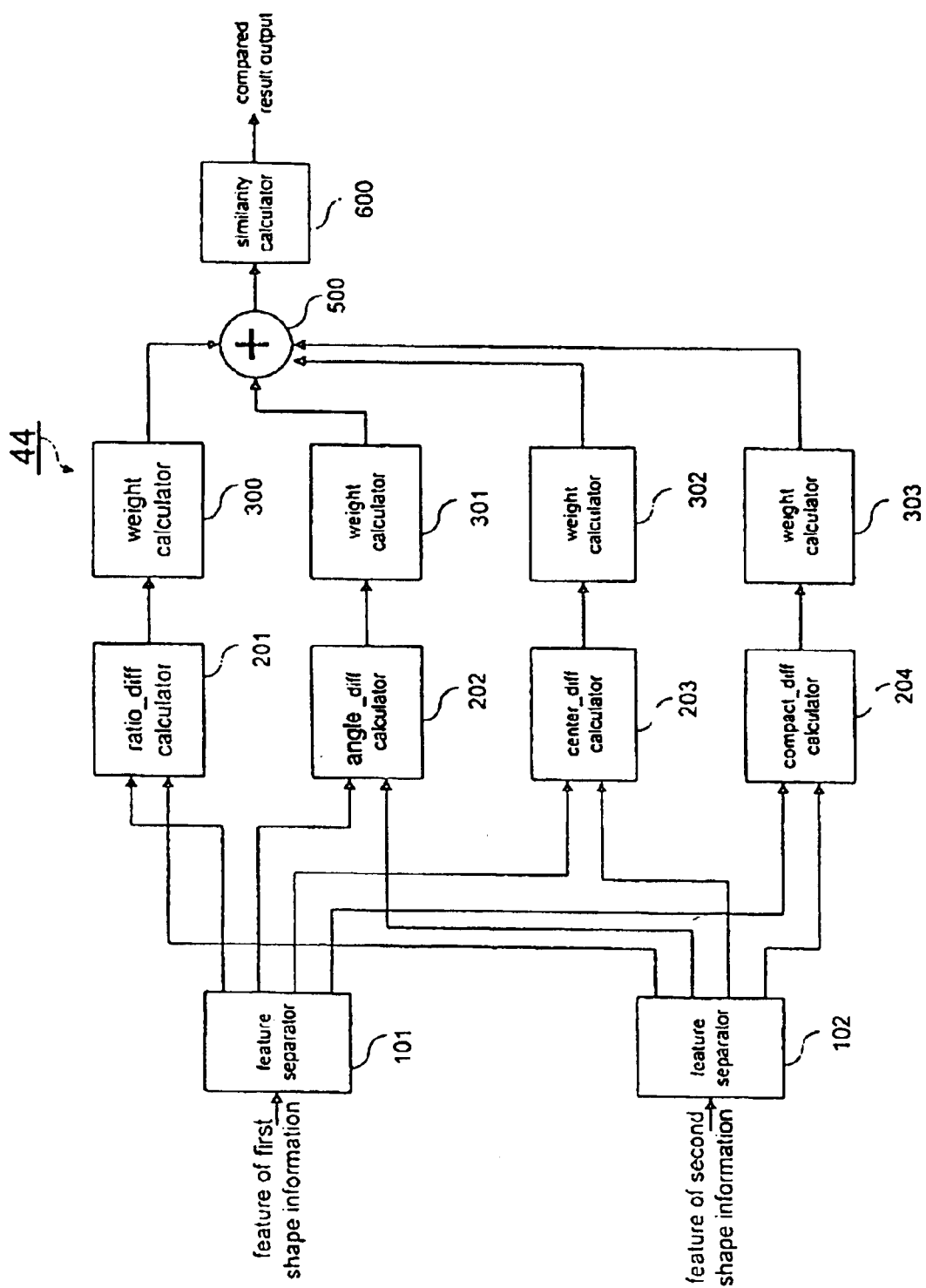
FIG. 11 is a block diagram of a similarity comparator in the multimedia data retrieval apparatus of FIG. 2.

FIG. 11 is a block diagram of the similarity comparator 44 in the multimedia data retrieval apparatus of FIG. 2. As shown in this drawing, the similarity comparator 44 includes a first feature separator 101 for separating the feature of the query image extracted by the shape information feature extractor 11 into an eigen vector magnitude ratio, eigen vector angle, center point and compactness, and a second feature separator 102 for separating each of the features of the image data in the created multimedia database into an eigen vector magnitude ratio, eigen vector angle, center point and compactness. The similarity comparator 44 further includes a calculator (referred to hereinafter as eigen_ratio_diff calculator) 201 for calculating a difference between the eigen vector magnitude ratios from the first and second feature separators 101 and 102, a calculator (referred to hereinafter as angle_diff calculator) 202 for calculating a difference between the eigen vector angles from the first and second feature separators 101 and 102, a calculator (referred to hereinafter as center_diff calculator) 203 for calculating a difference between the center points from the first and second feature separators 101 and 102, and a calculator (referred to hereinafter as compact_diff calculator) 204 for calculating a difference between the compactnesses from the first and second feature separators 101 and 102. The similarity comparator 44 further includes first to fourth weight calculators 300–303 for calculating weights to the eigen vector magnitude ratio difference from the eigen_ratio_diff calculator 201, the eigen vector angle difference from the angle_diff calculator 202, the center point difference from the center_diff calculator 203 and the compactness difference from the compact_diff calculator 204, respectively. The similarity comparator 44 further includes an adder 500 for adding the weighted eigen vector magnitude ratio difference, eigen vector angle difference, center point difference and compactness difference from the first to fourth weight calculators 300–303, and a similarity calculator 600 for calculating the similarity between the feature of the query image extracted by the shape information feature extractor 11 and each of the features of the image data in the created multimedia database on the basis of the result added by the adder 500. In the preferred embodiment of the present invention, the similarity comparator 44 may include any one or a combination of the eigen_ratio_diff calculator 201, angle_diff calculator 202, center_diff calculator 203 and compact_diff calculator 204 according to the presence of the eigen_ratio calculator 41, angle calculator 42, center_point calculator 43 and compact calculator 44 in each of the shape information feature extractor 11 and image feature extractor 22. Most preferably, the similarity comparator 44 may include all of the eigen_ratio_diff calculator 201, angle_diff calculator 202, center_diff calculator 203 and compact_diff calculator 204 to express the similarity very precisely.

Next, a detailed description will be given of the operation of the similarity comparator 44 with the above-mentioned construction in accordance with the present invention.

First, upon receiving the feature of the query image extracted by the shape information feature extractor 11, the first feature separator 101 separates the received feature into an eigen vector magnitude ratio, eigen vector angle, center point and compactness. Also, the second feature separator 102 receives each of the features of the image data in the created multimedia database and separates the received feature into an eigen vector magnitude ratio, eigen vector angle, center point and compactness. Then, the eigen_ ratio_diff calculator 201 calculates a difference between the eigen vector magnitude ratios from the first and second feature separators 101 and 102, and the angle_diff calculator 202 calculates a difference between the eigen vector angles from the first and second feature separators 101 and 102. Also, the center_diff calculator 203 calculates a difference between the center points from the first and second feature separators 101 and 102, and the compact_diff calculator 204 calculates a difference between the compactnesses from the first and second feature separators 101 and 102. The first to fourth weight calculators 300–303 apply proper weights to the eigen vector magnitude ratio difference from the eigen_ratio_diff calculator 201, the eigen vector angle difference from the angle_diff calculator 202, the center point difference from the center_diff calculator 203 and the compactness difference from the compact_diff calculator 204, respectively. Subsequently, the adder 500 adds the weighted eigen vector magnitude ratio difference, eigen vector angle difference, center point difference and compactness difference from the first to fourth weight calculators 300–303, and the similarity calculator 600 calculates the similarity between the feature of the query image extracted by the shape information feature extractor 11 and each of the features of the image data in the created multimedia database on the basis of the result added by the adder 500. Then, the similarity calculator 600 provides the calculated result to the compared result output unit 55.

At present, multidegree moments such as Zernike moments are used as shape information descriptors [see: CHO_HUAKTEN, ROLAND T. CHIN, On Image Analysis by the Methods of Moments, IEEE Trans. PAMI, vol. 10, NO. 4, July 1998]. An n-degree moment can be calculated in the form of sum of powers as in the below equation 8:

$$M_{pq} = \int_{-\infty}^{+\infty} \int_{-\infty}^{+\infty} x^p y^q f(x,y) dx dy \qquad \text{[Equation 8]}$$

where, p+q=n.

Accordingly, as the degree is higher, the powers are increased in number, resulting in a complexity in calculation. To the contrary, in the present invention, a moment of the first degree is calculated as in the equation 2 to obtain a center point as a shape information descriptor. Further, the calculation of a covariance matrix is composed of only multiplication, addition and subtraction as in the equation 4. Therefore, the present invention ensures a smaller amount of calculation as compared with conventional methods employing moments. Further, the present invention can regulate an expression degree of shape information by adjusting the number of layers and ensure a consistency against rotation, scaling and translation of the shape information. Furthermore, in the case where the present invention is implemented in a hardware manner, simple calculation means such as the covariance matrix calculation means, eigen vector calculation means, feature extraction means and region partition means are provided and repeated in operation, thereby making the hardware construction simple. Therefore, the present invention has the effect of accurately expressing shape information with a small amount of calculation and a small amount of data to accurately and rapidly retrieve desired multimedia data.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for retrieving multimedia data using shape information, comprising the steps of:
   a) receiving shape information of a query image and extracting a feature of the received shape information using a shape information descriptor based on eigen vectors of a multilayer covariance matrix, said shape information descriptor comprising a ratio of magnitudes of said eigen vectors, an angle of any one of said eigen vectors, a center point in a given region and a compactness in the given region;
   b) extracting a feature of each image data in the same manner as said step a);
   c) creating a multimedia database on the basis of said features extracted at said step b);
   d) comparing said feature of said query image with said features of said image data in said multimedia database to calculate similarities there between; and
   e) outputting the results calculated at said step d).

2. The method as set forth in claim 1, wherein said step a) includes the steps of:
   a-1) obtaining a covariance matrix of said shape information of said query image;
   a-2) obtaining eigen vectors of said covariance matrix obtained at said step a-1);
   a-3) extracting said feature of said shape information of said query image using a shape information descriptor based on said eigen vectors obtained at said step a-2);
   a-4) partitioning said shape information of said query image into a plurality of regions on the basis of two axes of said eigen vectors obtained at said step a-2); and
   a-5) repeating said steps a-1) to a-4) with respect to each of said regions partitioned at said step a-4) until a given layer becomes a last layer.

3. The method as set forth in claim 1, wherein said shape information is contour information of a binary image.

4. The method as set forth in claim 1, wherein said two axes of said eigen vectors are major and minor axes and said eigen vector magnitude ratio is a ratio of the magnitude of said eigen vector of said minor axis to the magnitude of said eigen vector of said major axis.

5. The method as set forth in claim 1, wherein said two axes of said eigen vectors are major and minor axes and said eigen vector magnitude ratio is a ratio of the magnitude of said eigen vector of said major axis to the magnitude of said eigen vector of said minor axis.

6. The method as set forth in claim 1, wherein said two axes of said eigen vectors are major and minor axes and said eigen vector angle is an angle of said eigen vector of said major axis.

7. The method as set forth in claim 1, wherein said two axes of said eigen vectors are major and minor axes and said eigen vector angle is an angle of said eigen vector of said minor axis.

8. The method as set forth in claim 1, wherein said eigen vector angle is defined by an absolute value of a difference between an eigen vector angle obtained in a previous layer and an eigen vector angle obtained in a current layer.

9. The method as set forth in claim 1, wherein said center point is defined by relative coordinate values from a center of mass in a first layer.

10. The method as set forth in claim 1, wherein said center point is defined by relative coordinate values when a center of mass in a first layer is set as an origin and two eigen vectors in said first layer are set respectively as major and minor axes.

11. The method as set forth in claim 1, wherein said center point is defined by values obtained by dividing coordinate values when a center of mass in a first layer is set as an origin and two eigen vectors in said first layer are set respectively as major and minor axes, by an eigen value of said major or minor axis in said first layer or any other reference value.

12. The method as set forth in claim 1, wherein said reference region is defined in a first layer by a minimum rectangular region which is parallel with two eigen vectors obtained in said first layer and fully contains said object region in said first layer, said reference region being partitioned into a plurality of regions by said eigen vectors to define reference regions in a second layer and over.

13. The method as set forth in claim 1, wherein said step d) includes the step of calculating said similarity between said feature of said query image and each of said features of said image data in said multimedia database on the basis of any one of a difference between eigen vector magnitude ratios of said query image and image data, a difference between eigen vector angles of said query image and image data, a difference between center points of said query image and image data and a difference between compactnesses of said query image and image data.

14. The method as set forth in claim 13, wherein said eigen vector angle difference is defined by an absolute value of a difference between an eigen vector angle in a previous layer and an eigen vector angle in a current layer.

15. The method as set forth in claim 13, wherein said eigen vector magnitude ratio difference is defined by an absolute value of the difference between said eigen vector magnitude ratios of said query image and image data.

16. The method as set forth in claim 13, wherein said step includes the step of applying a weight to said eigen vector angle difference on the basis of said eigen vector magnitude ratios if said eigen vector magnitude ratios are approximated to 1.

17. The method as set forth in claim 13, wherein said center point difference is defined by an absolute value of the difference between said center points of said query image and image data.

18. The method as set forth in claim 13, wherein said compactness difference is defined by an absolute value of the difference between said compactnesses of said query image and image data.

19. An apparatus for retrieving multimedia data using shape information, comprising:
   shape information feature extraction means for receiving shape information of a query image and extracting a feature of the received shape information using a shape information descriptor based on eigen vectors of a multi-layer covariance matrix, said feature extraction means comprising a first calculator for calculating a ratio of magnitudes of said eigen vectors, a second calculator for calculating an angle of any one of said eigen vectors, a third calculator for calculating a center point in a given region, and a fourth calculator for calculating a compactness in the given region;
   image feature extraction means for extracting a feature of each image data in the same manner as said shape information feature extraction means;
   multimedia database creation means for creating a multimedia database on the basis of said features extracted by said image feature extraction means;
   similarity comparison means for comparing said feature of said query image extracted by said shape information feature extraction means with said features of said image data in said multimedia database to calculate similarities therebetween; and
   compared result output means for outputting the results calculated by said similarity comparison means.

20. The apparatus as set forth in claim 19, wherein said shape information feature extraction means includes:
   a first switch for making a distinction between an initial input image and an output image from region partition means and transferring said initial input image to covariance matrix calculation means if a given layer is an initial layer and said output image from said region partition means to said covariance matrix calculation means if said given layer is not said initial layer;
   said covariance matrix calculation means calculating a covariance matrix for shape information of the image transferred from said first switch;
   eigen vector calculation means for calculating eigen vectors of said covariance matrix calculated by said covariance matrix calculation means;
   feature extraction means for extracting a feature of said shape information of said image transferred from said first switch on the basis of said eigen vectors calculated by said eigen vector calculation means;
   said region partition means partitioning said shape information of said image transferred from said first switch into a plurality of regions according to two axes of said eigen vectors calculated by said eigen vector calculation means if said given layer is not a last layer; and
   a second switch for transferring said feature extracted by said feature extraction means to an output terminal if said given layer is said last layer and to said region partition means if said given layer is not said last layer.

21. The apparatus as set forth in claim 19, wherein said shape information is contour information of a binary image.

22. The apparatus as set forth in claim 19, wherein said two axes of said eigen vectors are major and minor axes and said eigen vector magnitude ratio calculator is adapted to calculate a ratio of the magnitude of said eigen vector of said minor axis to the magnitude of said eigen vector of said major axis.

23. The apparatus as set forth in claim 19, wherein said two axes of said eigen vectors are major and minor axes and said eigen vector magnitude ratio calculator is adapted to calculate a ratio of the magnitude of said eigen vector of said major axis to the magnitude of said eigen vector of said minor axis.

24. The apparatus as set forth in claim 19, wherein said two axes of said eigen vectors are major and minor axes and said eigen vector angle calculator is adapted to calculate an angle of said eigen vector of said major axis.

25. The apparatus as set forth in claim 19, wherein said two axes of said eigen vectors are major and minor axes and said eigen vector angle calculator is adapted to calculate an angle of said eigen vector of said minor axis.

26. The apparatus as set forth in claim 19, wherein said eigen vector angle calculator is adapted to calculate an absolute value of a difference between an eigen vector angle obtained in a previous layer and an eigen vector angle obtained in a current layer.

27. The apparatus as set forth in claim 19, wherein said center point calculator is adapted to obtain relative coordinate values from a center of mass in a previous layer.

28. The apparatus as set forth in claim 19, wherein said center point calculator is adapted to obtain relative coordinate values when a center of mass in a first layer is set as an origin and two eigen vectors in said first layer are set respectively as major and minor axes.

29. The apparatus as set forth in claim 19, wherein said center point calculator is adapted to divide coordinate values when a center of mass in a first layer is set as an origin and two eigen vectors in said first layer are set respectively as major and minor axes, by an eigen value of said major or minor axis in said first layer.

30. The apparatus as set forth in claim 19, wherein said center point calculator is adapted to divide a distance from a center of mass obtained in a first layer to a center of mass of each region by an eigen value of a major or minor axis obtained in said first layer or any other reference value.

31. The apparatus as set forth in claim 19, wherein said reference region is defined in a first layer by a minimum rectangular region which is parallel with two eigen vectors obtained in said first layer and fully contains said object region in said first layer, said reference region being partitioned into a plurality of regions by said eigen vectors to define reference regions in a second layer and over.

32. The apparatus as set forth in claim 19, wherein said similarity comparison means includes:

a first feature separator for separating said feature of said query image extracted by said shape information feature extraction means into an eigen vector magnitude ratio, an eigen vector angle, a center point and a compactness;

a second feature separator for separating each of said features of said image data in said multimedia database into an eigen vector magnitude ratio, an eigen vector angle, a center point and a compactness;

a first difference calculator for calculating a difference between said eigen vector magnitude ratios from said first and second feature separators;

a second difference calculator for calculating a difference between said eigen vector angles from said first and second feature separators;

a third difference calculator for calculating a difference between said center points from said first and second feature separators;

a fourth difference calculator for calculating a difference between said compactnesses from said first and second feature separators;

first to fourth weight calculators for calculating weights to said eigen vector magnitude ratio difference, eigen vector angle difference, center point difference and compactness difference from said first to fourth difference calculators, respectively;

an adder for adding the weighted eigen vector magnitude ratio difference, eigen vector angle difference, center point difference and compactness difference from said first to fourth weight calculators; and a similarity calculator for calculating said similarity between said feature of said query image extracted by said shape information feature extraction means and each of said features of said image data in,said multimedia database on the basis of the result added by said adder.

33. The apparatus as set forth in claim 32, wherein said second difference calculator is adapted to calculate an absolute value of a difference between an absolute value of a difference between eigen vector angles in previous and current layers of said query image and an absolute value of a difference between eigen vector angles in previous and current layers of said image data.

34. The apparatus as set forth in claim 32, wherein said first difference calculator is adapted to calculate an absolute value of the difference between said eigen vector magnitude ratios of said query image and image data.

35. The apparatus as set forth in claim 32, wherein said third difference calculator is adapted to calculate an absolute value of the difference between said center points of said query image and image data.

36. The apparatus as set forth in claim 32, wherein said fourth difference calculator is adapted to calculate an absolute value of the difference between of said query image and image data.

* * * * *